US010024489B2

(12) United States Patent
Galliot et al.

(10) Patent No.: US 10,024,489 B2
(45) Date of Patent: Jul. 17, 2018

(54) LUG WITH POCKET AND/OR RELIEF

(71) Applicants: Airbus Operations (SAS), Toulouse (FR); Airbus SAS, Blagnac (FR)

(72) Inventors: Andre Galliot, Toulouse (FR); Lionel Juillen, Toulouse (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 0 days.

(21) Appl. No.: 14/978,720

(22) Filed: Dec. 22, 2015

(65) Prior Publication Data
US 2016/0178117 A1 Jun. 23, 2016

(30) Foreign Application Priority Data

Dec. 23, 2014 (FR) .................................. 14 63215

(51) Int. Cl.
| A47B 96/06 | (2006.01) |
| F16M 13/02 | (2006.01) |
| B64C 1/06 | (2006.01) |
| F16C 7/00 | (2006.01) |
| F16C 11/04 | (2006.01) |

(52) U.S. Cl.
CPC .............. *F16M 13/02* (2013.01); *B64C 1/06* (2013.01); *F16C 7/00* (2013.01); *F16C 11/04* (2013.01); *F16C 2326/43* (2013.01)

(58) Field of Classification Search
CPC . F16M 13/02; B64C 1/06; F16C 11/04; F16C 7/00; F16C 2326/43; Y10T 403/42; Y10T 403/725; F16B 7/0446
USPC ....... 248/205.1, 200, 300; 16/105; 24/713.6, 24/712.6, 712.2, 197, 168, 132 R, 712.5, 24/712.7
See application file for complete search history.

(56) References Cited

U.S. PATENT DOCUMENTS 1,359,734 A * 11/1920 Parsons .............. B62D 33/0273
16/392
2,302,668 A * 11/1942 Banneyer ................ F16L 3/222
248/68.1

(Continued)

FOREIGN PATENT DOCUMENTS

| CN | 201813246 U | * 4/2011 |
| CN | 202862138 U | * 4/2013 |

(Continued)

OTHER PUBLICATIONS

French Search Report, Nov. 11, 2015.
"The stress distribution in strip loaded in tension by means of a central pin," J. Applied Mech. 85-90-1940.

*Primary Examiner* — Kimberly T Wood
(74) *Attorney, Agent, or Firm* — Greer, Burns & Crain, Ltd.

(57) ABSTRACT

A joining part with a wing comprises a through bore defining a fastening direction perpendicular to the wing. The wing comprises at least one non-through pocket configured to reduce the stress gradient in a peripheral zone of the through bore and/or at least one relief configured to reduce the stress gradient in a peripheral zone of the through bore, the non-through pocket forming a cavity in the thickness of the wing and comprising a curved side at a distance from the peripheral edge of the through bore. The joining part may be part of a lug, such as, for an aircraft fitting.

9 Claims, 1 Drawing Sheet

(56) References Cited

U.S. PATENT DOCUMENTS

| | | | | | |
|---|---|---|---|---|---|
| 3,494,584 | A | * | 2/1970 | Dubey | H01H 85/2045<br>174/158 R |
| 3,729,159 | A | * | 4/1973 | Foster | E04G 17/02<br>248/205.1 |
| 3,747,158 | A | * | 7/1973 | Craig | E05D 15/0634<br>16/105 |
| 3,810,597 | A | * | 5/1974 | Flegel | E03C 1/324<br>248/214 |
| 4,569,495 | A | * | 2/1986 | Woudenberg | G09F 13/16<br>248/160 |
| 4,873,744 | A | * | 10/1989 | Johnson, Jr. | E05D 5/04<br>16/247 |
| 4,899,978 | A | * | 2/1990 | Gates | E04G 17/0754<br>249/219.2 |
| 5,257,437 | A | * | 11/1993 | Salice | E05D 5/0276<br>16/236 |
| 5,852,857 | A | * | 12/1998 | Mark | A43C 3/00<br>24/712.2 |
| 6,062,341 | A | * | 5/2000 | Frank | E04G 5/00<br>182/113 |
| 6,547,478 | B1 | * | 4/2003 | Lin | A47B 96/061<br>248/200 |
| 7,281,696 | B2 | * | 10/2007 | Kida | B60J 5/06<br>248/300 |
| 2012/0006942 | A1 | * | 1/2012 | Coulter | B64C 3/28<br>244/131 |

FOREIGN PATENT DOCUMENTS

| | | | |
|---|---|---|---|
| DE | 1575489 | | 1/1970 |
| DE | 3243238 | | 5/1984 |
| DE | 8629001 | | 1/1987 |
| DE | 20202702 | | 6/2002 |
| EP | 0524116 | | 1/1993 |
| EP | 2072396 A2 | * | 6/2009 ............ B64D 27/26 |
| FR | 2997143 | | 4/2014 |
| GB | 465666 A | * | 5/1937 ............... A01L 7/04 |

* cited by examiner

LUG WITH POCKET AND/OR RELIEF

CROSS-REFERENCES TO RELATED APPLICATIONS

This application claims the benefit of the French patent application No. 1463215 filed on Dec. 23, 2014, the entire disclosures of which are incorporated herein by way of reference.

BACKGROUND OF THE INVENTION

The present invention relates to a joining part with a wing comprising a through bore.

The present invention generally relates to the field of connectors or attachments for joining different structural elements together, involving a single fastening direction. It applies, in a non-limiting manner, to the field of aircraft construction.

In conventional practice, numerous joining parts are used in aeronautics and, more particularly, in the construction of an aircraft, for example, for making structural joins, attaching equipment, or engines, landing gear, and so on.

By way of example, use is made of numerous lugs in aircraft, these lugs belonging to aircraft fittings, shackles or even connecting rods commonly used to join various elements of the aircraft structure.

Although there may be varied lug models, such lugs typically have a wing comprising a through bore defining a fastening direction perpendicular to the wing of the lug. The fastening direction corresponds, for example, to the axis of a screw or any other type of fastener inserted into the through bore.

Given the loads and forces taken up by the lug, stress concentrations arise over the peripheral zone around the through bore.

The stresses are at their maximum at the edge of the through bore and may lead to the lug prematurely suffering from fatigue.

In particular, risks of cracks or splits are observed at the edge of the bore, these cracks then potentially propagating into the peripheral zone around the through bore, in the linking parts of the lug located on either side of the through bore.

A known solution is described in document FR 2 997 143, which aims to limit the stress concentrations in the immediate vicinity of a through bore of a lug wing.

Document FR 2 997 143 thus makes provision for the formation of a through hole in the wing of the lug. This through hole is arranged along the longitudinal median axis of the wing.

Furthermore, through orifices are added between the bore and the aforesaid hole, offset on either side of the longitudinal median axis of the wing.

SUMMARY OF THE INVENTION

The present invention aims to improve the structure of a joining part to enhance its ability to withstand the appearance and the propagation of cracks in the part.

To that end, the present invention relates to a joining part with a wing comprising a through bore defining a fastening direction perpendicular to the wing.

According to the invention, the wing comprises at least one non-through pocket configured to reduce the stress gradient in a peripheral zone of the through bore and/or at least one relief configured to reduce the stress gradient in a peripheral zone of the through bore, said non-through pocket forming a cavity in the thickness of the wing and comprising a curved side at a distance from the peripheral edge of the through bore.

By seeking to reduce the stress gradient around the through bore by means of the addition of a non-through pocket and/or of a relief it is possible to reduce the observed stress peak and thus to delay the start of cracks at the edge of the through bore and the propagation of these cracks in the linking part.

The reduction in the stress gradient enables homogeneous stress values to be obtained in the peripheral zone of the bore, thus limiting the propagation of the cracks in the joining part.

This results in a beneficial effect not just on the weight of the joining part but also on its service life and dimensions, in terms of damage tolerance.

According to various features and diverse embodiments of the invention, which may be taken in isolation or in combination:

the non-through pocket forms a cavity in the surface of the wing, the cavity having a base extending in a plane substantially parallel to a plane of the wing;

the through bore is arranged in an end portion of the wing and centered on the intersection of a longitudinal median axis of the wing and of a transverse axis and said at least one non-through pocket and/or said at least one relief are located solely on a portion of the wing extending on the same side of said transverse axis, opposite a free end of the wing;

said at least one non-through pocket extends on either side of the longitudinal median axis;

said at least one non-through pocket and/or said at least one relief have a side extending parallel to a longitudinal edge of said wing;

said curved side of said at least one non-through pocket extends over an angular sector of between 30° and 180°;

said curved side of said at least one non-through pocket extends over a portion of an arc of a circle concentric with said through bore;

said at least one relief has a rib part extending substantially parallel to a longitudinal edge of said wing and an end part forming an angle of between 0 and 90° with said rib part;

said at least one non-through pocket and/or said at least one relief are symmetrical relative to a longitudinal median axis of said wing;

the joining part constitutes a lug of an aircraft fitting.

BRIEF DESCRIPTION OF THE DRAWINGS

Further particular features and advantages of the invention will become apparent in the course of the following description.

In the appended drawings, which are provided by way of non-limiting examples.

DETAILED DESCRIPTION OF THE PREFERRED EMBODIMENTS

Figure 1:
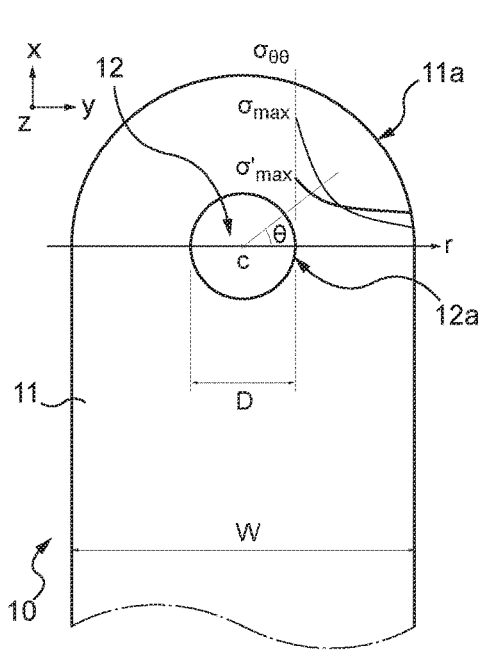
FIG. 1 is an explanatory diagram of the distribution of stresses in a joining part.

With reference to FIG. 1, a summary will first be given of the distribution of stresses in a joining part with a wing comprising a through bore.

In the remainder of the description, the term "comprising" does not exclude other elements or steps, and the singular article does not exclude the plural.

As clearly illustrated in FIG. 1, the joining part 10 comprises a wing 11 comprising a through bore 12.

This type of joining part is used for joining different structural elements together, requiring a single joining point, achieved by means of a single fastening (not shown) on the axis of the through bore 12.

Owing to the presence of the through bore 12 in the joining part 10, the fastening direction Z is defined perpendicularly to the wing 11, which extends in a plane X, Y.

This type of joining part can be found in various types of joints used, in particular, in aeronautics.

The joining parts, attaching various structures of an aircraft and also called fittings, comprise a lug with one or more wings that are each provided with a through bore in order to interact with a fastening.

It is thus estimated that, in an aircraft, more than a thousand lugs, corresponding to elementary joining points, are used at various points of the structure.

Consequently, the improvement of their performance levels and service life, and also any, albeit minimal, gain in weight, are of significance.

It is possible to identify various types of lug commonly used in aircraft: first, lugs formed as an isolated part, or lugs secured by one of their distant ends to their support.

This type of lug can be found, in particular, at the end of long connecting rods or, alternatively, in a shackle.

Other types of lug are secured by insertion into ribbed panels or involve one or more edge flanges that may be affixed to structural parts using assembly screws.

The illustrative diagram of FIG. 1 applies to any type of lug where a through bore 12 is present in a wing 11 and where the joining function is provided by means of a single fastening (screw, rod, bolt).

A stress concentration is observed, during use, in the peripheral zone of the through bore 12.

A concentration peak is observed at the peripheral edge 12a of the through bore 12.

A curve thus illustrates, as a function of the distance r from the center c of the through bore 12, the value of the tangential stress $\sigma_{\theta\theta}$ observed in the wing 11 and, more particularly, in the peripheral zone around the through bore 12.

In FIG. 1, the curve in fine lines illustrates, by way of example, a tangential stress gradient observed in the peripheral zone of the through bore 12 as a function of the distance r from the center c of the through bore 12a.

Thus, the maximum tangential stress $\sigma_{max}$ is located at the edge 12a of the through bore 12, i.e., at a distance D/2 from the center c of the through bore 12, where D is the diameter of the through bore 12.

The value of the tangential stress $\sigma_{\theta\theta}$ varies greatly between the peripheral edge 12a of the through bore 12 and a peripheral edge 11a of the wing 11 of the joining part 10.

Owing to this significant level of stress, cracks may appear at the peripheral edge 12a of the through bore 12, and they are likely to propagate in the wing 11 in the direction of a radius of the through bore 12.

A description will now be given with reference to FIGS. 2 and 3 of a first embodiment of a joining part 10 that makes it possible to reduce the crack appearance and propagation times.

The wing 11 comprises at least one non-through pocket 21 or at least one relief 22 configured to reduce the stress gradient, and thus the value of the maximum tangential stress $\sigma_{max}$ in the peripheral zone of the through bore 12.

Figure 2:
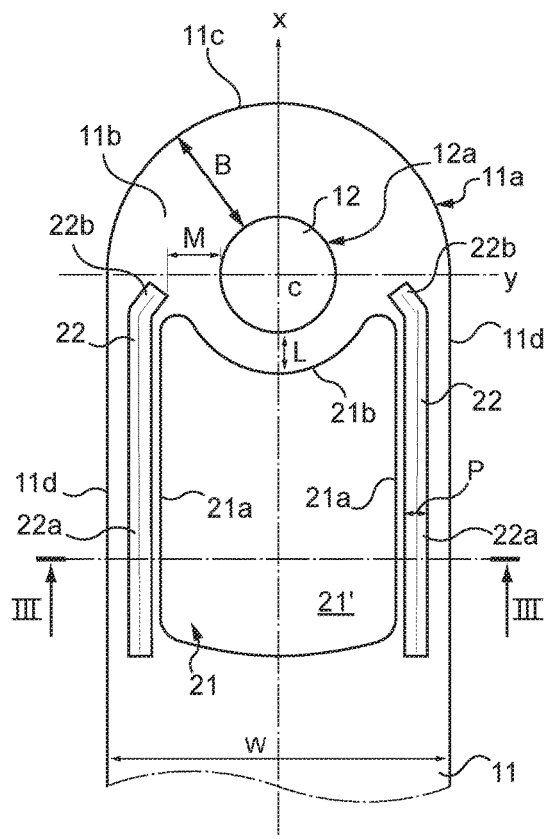
FIG. 2 is a schematic top view of a joining part according to a first embodiment of the invention.

In the embodiment illustrated in FIG. 2, and in a non-limiting manner, the wing 11 comprises a non-through pocket 21 and two reliefs 22.

The non-through pocket 21 and the reliefs 22 are configured to reduce the stress gradient, as illustrated on the curve of FIG. 1 (in dark lines).

A stress gradient is thus observed that has a tangential stress peak $\sigma'_{max}$ that is less than the tangential stress peak $\sigma_{max}$ observed in the absence of a pocket and/or of a relief. Furthermore, the value of the tangential stress $\sigma_{\theta\theta}$ is more homogeneous in the peripheral zone of the through bore 12.

This reduction in the stress gradient thus results in an extension of the service life before the appearance of cracks or splits at the peripheral edge 12a of the through bore 12 and a reduction in the speed of propagation of the cracks in the peripheral zone of the through bore 12.

The positioning of the non-through pocket 21 and of the reliefs 22, and also their dimensions, are configured to obtain a reduction in the stress gradient and thus in the value of the maximum tangential stress $\sigma_{max}$.

Thus, the dimensions of the joining part 10 take account not only of the width W of the wing 11, the diameter D of the bore 12 and the thickness T of the wing 11, but also the thickness T1 at the non-through pocket 21, which is less than the thickness T of the wing 11, and the thickness T2 of the reliefs 22, which is greater than the thickness T of the wing 11. The choice of these parameters makes it possible to modify the mechanical behavior of the joining part 10 and thus to reduce the value of the stresses in the peripheral zone of the through bore 12, which corresponds to the most loaded zone of the joining part 10 during use.

More precisely in FIG. 2, in this first embodiment the through bore 12 is arranged in an end portion 11b of the wing 11.

The through bore 12 is centered on the intersection c of a longitudinal median axis X of the wing 11 and of a transverse axis Y perpendicular to the longitudinal median axis X.

The center c of the through bore 12 merges with the fastening direction Z perpendicular to the wing 11, corresponding to the direction of a fastening (not shown).

The non-through pocket 21 and the reliefs 22 are located only in a portion of the wing 11 that extends on the same side of the transverse axis Y, opposite a free end 11c of the wing 11.

The non-through pocket 21 extends on either side of the longitudinal median axis X.

The non-through pocket 21 thus forms a cavity in the surface of the wing 11, with a base 21' extending in a plane substantially parallel to the plane X, Y of the wing 11 of the joining part 10.

It will be noted that a non-through pocket 21 may also be arranged on each face of the wing 11, preferably symmetrically relative to the plane X, Y of the wing 11 of the joining part 10.

Figure 3:
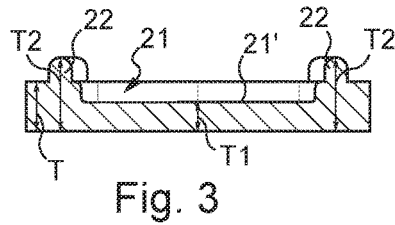
FIG. 3 is a sectional view along line III-III in FIG. 2.

As clearly illustrated in FIG. 3, the non-through pocket 21 thus forms a cavity in the thickness T of the wing 11 such that the thickness T1 at the non-through pocket 21 is less than the thickness T of the wing 11.

In other words, the non-through pocket 21 corresponds to a non-through thinner zone in the wing 11.

The reliefs 22 are, in this embodiment, arranged on either side of the non-through pocket 21, between the non-through pocket 21 and a longitudinal edge 11d of the wing 11.

As clearly illustrated in FIG. 3, the reliefs 22 are in this case constituted respectively by a rib of which the thickness T2 is greater than the thickness T of the wing 11.

Furthermore, the non-through pocket 21 and the reliefs 22 each have a side that extends parallel to the longitudinal edge 11d of the wing 11.

More precisely, in the embodiment illustrated in FIG. 2, the non-through pocket 21 comprises two longitudinal sides 21a extending substantially parallel to the longitudinal median axis X. The two longitudinal sides 21a of the non-through pocket 21 are parallel respectively to two longitudinal edges 11d of the wing 11.

In this embodiment, the distance between each longitudinal side 21a of the non-through pocket 21 and the longitudinal edge 11d of the wing 11 is substantially identical.

Furthermore, the two reliefs 22 each have a rib part 22a of which the sides extend parallel to the longitudinal edges 11d of the wing 11 and, in this case, parallel to the longitudinal median axis X of the wing 11.

Here, each rib part 22a is rectilinear and has a width P in the transverse direction Y of the wing 11.

In this embodiment, the distance between each rib part 22a and the longitudinal edge 11d of the wing 11 is substantially identical.

Each relief 22 has, furthermore, in this case, and in a non-limiting manner, an end part 22b forming a non-zero angle relative to the rib part 22a and oriented toward the through bore 12 in the wing 11.

The orientation of the end part 22b of each relief 22 corresponds to an orientation in the direction of the principal maximum stress around the through bore 12. The reliefs 22 thus play a stiffening role, improving the mechanical strength of the wing 11.

More generally, the end part 22b may form an angle of between 0 and 90° with the rib part 22a, such that the relief 22 may be rectilinear or have an inclined end part 22b.

Moreover, the non-through pocket 21 comprises a curved side 21b extending, in this case, over a portion of an arc of a circle concentric with the through bore 12.

The curved side 21b of the non-through pocket 21 extends over an angular sector of at least 30° and, more generally, a sector that may be between 30° and 180°.

In the embodiment illustrated in FIG. 2, the angular sector of the curved side 21b of the non-through pocket 21 extends, by way of example, substantially over 120°.

It will be noted that the angular sector varies as a function of the ratio W/D, where W corresponds to the width of the wing 11 and D to the diameter of the through bore 12.

Generally, when the dimensions of the joining part 10 described above are chosen, the transverse section is kept substantially constant in the wing 11, irrespective of the transverse plane considered.

Thus, at the transverse axis Y, passing through the center c of the through bore 12, the section S of the wing 11 is equal to:

$$S=(W-D)\times T$$

The section of the wing 11 taken in other transverse planes parallel to the transverse axis Y remains substantially constant at this value of section S.

Thus, as illustrated in FIG. 3, the dimensions of the reliefs 22, the non-through pocket 21, including the various thicknesses T1, T2, T of the wing 11, are chosen so as to meet the criterion of maintenance of the value of the section S.

In addition to these parameters, the dimensions of the joining part 10 also take account of the distance L separating the curved side 21b of the through bore 12 and the distance between each longitudinal side 21a of the non-through pocket 21 and the corresponding longitudinal edge 11d of the wing 11.

It will also be noted that, preferably, the positioning of the non-through pocket 21 and of the reliefs 22 is symmetrical relative to the longitudinal median axis X of the wing 11.

Moreover, the non-through pocket 21 and the reliefs 22 are, in this case, symmetrical relative to the longitudinal median axis X of the wing 11.

Furthermore, the peripheral zone around the through bore 12 that is affected by the load introduced at the fastening axis extends in a portion of the wing 11 located at a maximum distance from the center c of the through bore 12 equal to 1.57×W, where W is the width of the wing 11 (see the definition of the size of the peripheral zone subject to stresses by THEOCARIS, in "The stress distribution in strip loaded in tension by means of a central pin," J. Applied Mech. 85-90-1940).

It is thus advantageous to provide one or more non-through pockets 21 and one or more reliefs 22 in a zone of the wing 11 that does not extend beyond this maximum distance of 1.57×W.

The design of a joining part 10 of this type will take account of all the parameters described above.

It will likewise take account of the value of the shortest distance L between the non-through pocket 21 and the through bore 12, which in this case corresponds to the distance L between the curved side 21b of the non-through pocket 21 and the peripheral edge 12a of the through bore 12.

Moreover, the dimensions of the joining part 10 will take account of the width P of the rib part 22a of the reliefs 22 and the shortest distance M between the reliefs 22 and the through bore 12.

In particular, the shortest distances L, M as defined above may be dimensioned as a function of the shortest distance B existing between the through bore 12 and the peripheral edge 11a of the wing 11.

It will be noted that, in the embodiment illustrated in FIG. 2, the free end 11c of the wing 11 has a semi-circular form around the through bore 12: the center of the free end 11c may advantageously be offset (upward, in the example illustrated in FIG. 2) relative to the center c of the through bore 12, the effect of this slight offset being to reduce the stress peak $\sigma_{max}$.

Here, the shortest distance B that exists between the through bore 12 and the peripheral edge 11a of the wing 11 corresponds to the value of the width of the linking part (W−D)/2 on the transverse axis y.

The shortest distance M between the reliefs 22 and the through bore 12 is advantageously less than the shortest distance B between the through bore 12 and the peripheral edge 11a of the wing 11 and greater than one quarter of the shortest distance B between the through bore 12 and the peripheral edge 11a of the wing 11.

Similarly, the shortest distance L between the non-through pocket 21 and the through bore 12 is advantageously greater than or equal to one third of the radius D/2 of the through bore 12.

Moreover, the distance between the longitudinal edges 11d of the wing 11 and the longitudinal sides 21a of the non-through pocket 21 and the distance between the longitudinal edges 11d of the wing 11 and the rib part 22a of the reliefs 22 may likewise be variable.

What is more, the provision of non-through pockets 21 in the joining part 10 makes it possible to reduce the weight of said joining part, which offers a significant advantage within the context of an aeronautical application, where several hundreds or thousands of lugs are used.

In particular, it will be noted that the addition of reliefs 22 as envisaged in the embodiment in FIG. 2 makes it possible further to reduce the thickness T1 of the wing 11 at the non-through pocket 21 because the presence of the reliefs 22 has a greater effect on the reduction of the value of the maximum tangential stress $\sigma_{max}$ than the presence of the non-through pocket 21. In a case such as this, the weight of the joining part 10 may be further reduced.

All the parameters described above are thus taken into account in terms of the dimensions of the joining part 10 illustrated in FIGS. 2 and 3.

By way of example, a joining part of this type may be a lug of an aircraft fitting, which may represent up to 80% of the cases of lugs used in an aircraft.

Figure 4:
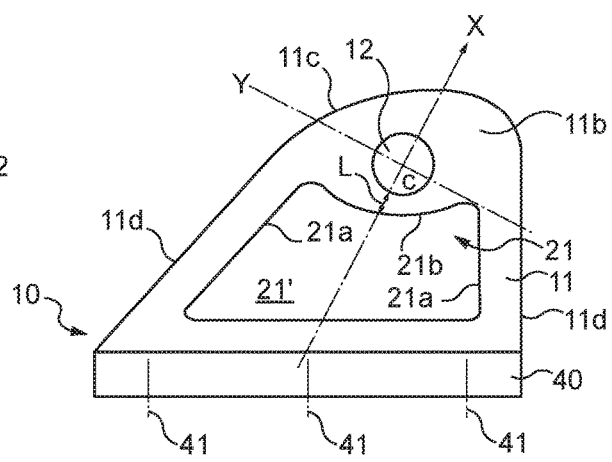
FIG. 4 is a schematic top view of a joining part comprising a lug according to a second embodiment of the invention.

FIG. 4, furthermore, illustrates a second embodiment of a joining part 10.

This joining part 10 is similar to the example described above with reference to FIG. 2 since it likewise involves a wing 11 comprising a through bore 12 defining a fastening direction perpendicular to the wing 11.

Features in FIG. 4 and FIG. 2 that are similar thus bear the same numerical references and have no need to be described again in detail at this point.

The joining part 10 in this case further comprises a fastening flange 40 allowing mounting of the joining part 10, for example by bolting (indicated in schematic form by axes (or screws) 41), to a structure such as an aircraft door.

In this embodiment, the wing 11 comprises a non-through pocket 21 configured to reduce the stress gradient in the peripheral zone of the through bore 12.

To that end, it will be noted that, as in the embodiment in FIG. 2, the non-through pocket 21 is located solely on a portion of the wing 11 that extends on the same side of the transverse axis Y, opposite a free end 11c of the wing 11.

The non-through pocket 21 furthermore extends on either side of the longitudinal median axis X of the wing 11.

It comprises two sides 21a each parallel to a longitudinal edge 11d of the wing 11.

The non-through pocket 21 also comprises a curved side 21b extending opposite the through bore 12.

In this case, the radius of the curved side 21b of the non-through pocket 21 is greater than the radius D/2 of the through bore 12, increased by the shortest distance L between the non-through pocket 21 and the through bore 12.

Thus, in this embodiment, the curved side 21b of the non-through pocket 21 does not extend over a portion of an arc of a circle concentric with the through bore 12.

Naturally, the examples described above with reference to FIGS. 2 to 4 are given only for purely illustrative purposes.

Thus, the number of non-through pockets 21 and of reliefs 22 may be different.

Furthermore, the wing 11 of the joining part 10 may have only one or several reliefs 22.

Generally, the joining part 10 is produced from metal and, for example, from steel, aluminum alloy, titanium alloy or, alternatively, nickel alloy.

The joining parts may, moreover, be produced by machining, but also using different fabrication techniques, including molding, stamping, additive layer manufacturing or, furthermore, by linear friction welding.

Advantageously, it is possible to use different materials when fabricating the wing 11 of the joining part 10 and, for example, different materials for fabricating the reliefs 22.

It will further be noted in the embodiment illustrated in FIG. 4 that the positioning of non-through pockets 21 and/or of reliefs may take account also of the presence of the fastening flange 40 and of the fastening stresses of the joining part 10 at the fastening flange 40.

Of course, numerous modifications may be made to the illustrative embodiments described above without departing from the context of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A joining part comprising:
   a wing having a thickness and extending substantially in an X-Y plane comprising:
   a single through bore defining a fastening direction perpendicular to said X-Y plane of the wing, and,
   separated from the through bore:
   at least one cavity configured to reduce a stress gradient in a peripheral zone of said through bore and having a thickness less than the thickness of the wing, said at least one cavity comprising a curved side at a distance from a peripheral edge of the through bore, and
   at least one relief configured to reduce a stress gradient in a peripheral zone of said through bore and having a thickness greater than the thickness of the wing, wherein a shortest distance between said at least one relief and said through bore is less than a shortest distance between said through bore and a peripheral edge of the wing.

2. The joining part according to claim 1, wherein said at least one cavity comprises a base extending in a plane substantially parallel to the X-Y plane of the wing.

3. The joining part according to claim 1, wherein at least one of said at one least cavity or said at least one relief has a side extending parallel to a longitudinal edge of said wing.

4. The joining part according to claim 1, wherein said at least one relief has a rib part extending substantially parallel to a longitudinal edge of said wing and an end part forming an angle of between 0 and 90° with said rib part.

5. The joining part according to claim 1, wherein said at least one relief comprises
   at least two reliefs, each relief configured to reduce a stress gradient in a peripheral zone of said through bore and having a thickness greater than the thickness of the wing, wherein a shortest distance between each relief and said through bore is less than a shortest distance between said through bore and a peripheral edge of the wing.

6. The joining part according to claim 1 wherein each relief is symmetrical relative to a longitudinal median axis of said wing.

7. A lug of an aircraft fitting comprising a joining part comprising:
   a wing having a thickness extending substantially in an X-Y plane comprising:

a single through bore defining a fastening direction perpendicular to said X-Y plane of the wing, and,
separated from the through bore:
at least one cavity configured to reduce a stress gradient in a peripheral zone of said through bore and having a thickness less than the thickness of the wing, said at least one cavity comprising a curved side at a distance from a peripheral edge of the through bore, and,
at least one relief configured to reduce a stress gradient in a peripheral zone of said through bore and having a thickness greater than the thickness of the wing, wherein a shortest distance between said at least one relief and said through bore is less than a shortest distance between said through bore and a peripheral edge of the wing.

8. The lug according to claim 7 wherein said at least one relief comprises at least two reliefs.

9. The lug according to claim 8, wherein each relief is symmetrical relative to a longitudinal median axis of said wing.

* * * * *